INVENTOR.
HOWARD L. STAHLE
BY Joseph Dugan
ATTORNEY

*INVENTOR.*
HOWARD L. STAHLE
BY Joseph A. Dwyer
ATTORNEY

INVENTOR.
HOWARD L. STAHLE
BY Joseph R. Dwyer
ATTORNEY

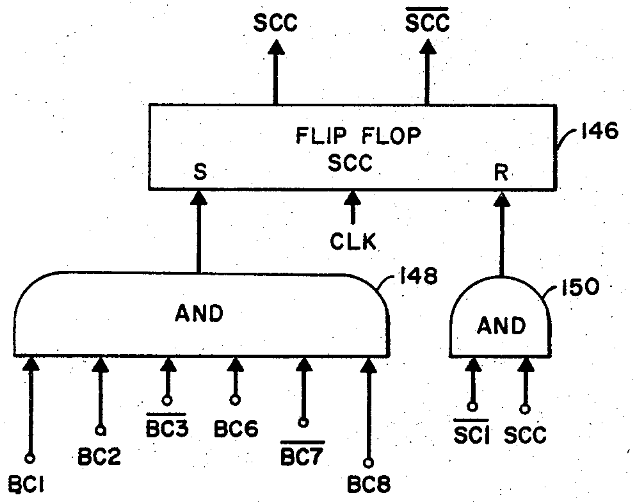
FIG. 7
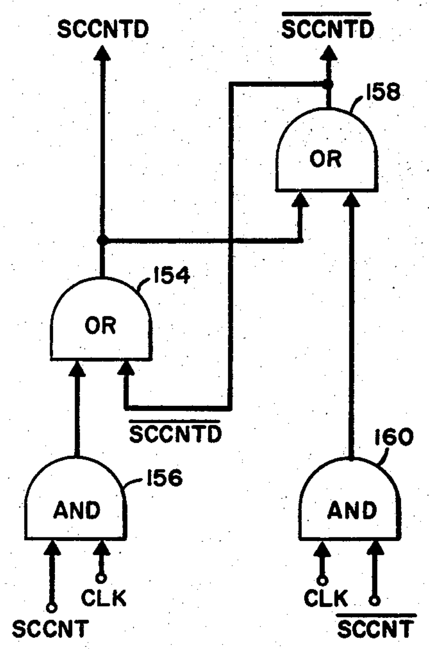
FIG. 9
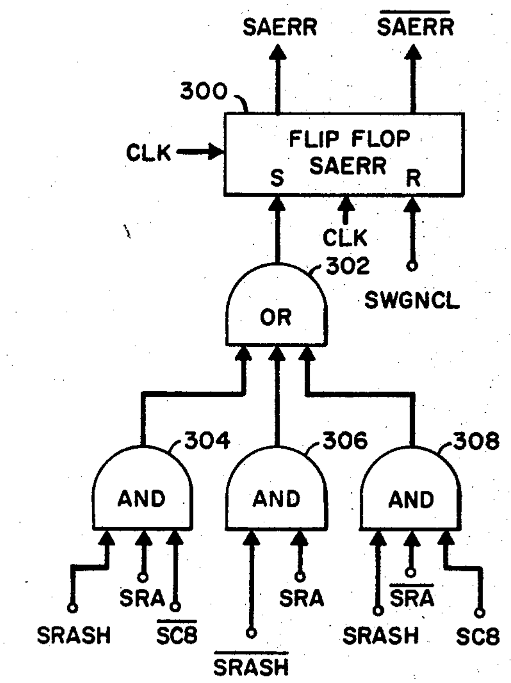
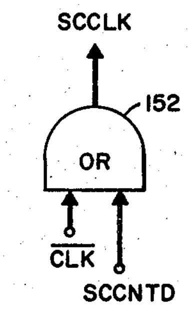
FIG. 8
FIG. 10
INVENTOR.
HOWARD L. STAHLE
BY Joseph R. Dwyer
ATTORNEY 3,422,406
INTERNAL ADDRESS GENERATING SYSTEM
Howard L. Stahle, Tujunga, Calif., assignor to General Precision, Inc., a corporation of Delaware
Filed May 23, 1966, Ser. No. 552,307
U.S. Cl. 340—172.5 5 Claims
Int. Cl. G11b 13/00

ABSTRACT OF THE DISCLOSURE

Logic circuitry for generating and recording the address to be used in a rotating memory. When recorded the circuitry is used to verify the address read and, if erroneous, will provide the address last acted upon, as well as indicating the occurrence of the error.

This invention relates to electronic computers, and more particularly to a novel and improved electronic computer address system which includes apparatus for internally keeping track of the address of the particular location the computer is operating upon and comparing this address with the actual address recorded in that location to verify its accuracy. Should an error appear in the address, the present invention will provide the address last acted upon and indicate that an error has occurred.

In the art of electronic computers operating on a fixed address system, there may be a chance, by malfunction or the like, for error to occur in the addres recorded therein. Fixed address, as well known in the art, identifies particular locations in sectors of data tracks of computer memories. The address may identify particular sectors of data tracks associated with a rotating memory drum, disc, or the like. In operation, a search is made for the particular fixed address so that data in locations identified by that address may be operated on within the computer. Should the address be erroneous due to malfunctions or the like within the computer, the wrong data is operated upon and the results therefrom would be an error in the computer output.

Using a disc memory as an example, data is normally recorded in a plurality of data tracks. Each data track is divided into $n$ number of sectors and each sector is divided into a number of bits. The sector addresses are permanently recorded on an address track in specific and predetermined bit positions of each sector. Normally, these fixed addresses are recorded in sequential order on the address track (0 to $n$). A read head associated with the disc memory reads each sector addressed during specific and predetermined bit positions.

Briefly described, the present invention provides a bit counter which is incremented by a clock associated with the memory. The bit counter is reset to zero when $m$ number of bits is attained, wherein $m$ represents the number of bits in a sector. When a specific and predetermined bit count is attained, a sector counter is shifted and incremented and stores therein the address of the particular location available for the computer to operate on. During the remainder of the sector, the sector counter contents do not change. A read amplifier associated with the address track contains the address read from the address track at the same time the sector counter is being incremented. Thus, the contents of sector counter should equal the contents of the read amplifier. If there is a difference, sector address error logic is enabled. The incrementation of the sector counter occurs before the actual sector address is read by the address read head and stored in the sector address register. Thus, the proper comparison can be made within sector address error logic.

An advantage of the present invention is that during the initial start-up the output of the read amplifier is loaded into the sector counter. Thus, the sector counter is initially made equal to the sector address read from the sector address track. After initial start-up, the sector counter operates independently of the sector address read head.

It, therefore, becomes one object of this invention to provide a novel and improved electronic computer addressing system which is capable of detecting sector address error.

Another object of this invention is to provide a novel and improved electronic computer address system which generates a sector address sensed by an address read head.

Another object of this invention is to provide a novel and improved electronic computer address system which generates a sector address before the actual sector address is sensed by the sector address read head and which may be, if desired, recorded in the correct sector address on a succeeding revolution, should the sector address generated differ from the sector address read.

Other objects and many of the attendant advantages of this invention will become more fully appreciated as the same becomes better understood by reference to the following detailed description, when considered in connection with the accompanying drawings which illustrate a preferred embodiment of this invention and wherein like reference numerals represent corresponding parts throughout the several views and wherein:

FIGURE 7 is a block diagram showing a sector counter carry logic diagrams which increment a sector counter;

FIGURE 8 is a block diagram showing the sector counter clock logic diagrams used for shifting the sector counter;

FIGURE 9 is a block diagram showing the sector counter count delayed logic diagram which is used to gate the shift clock signal to the sector counter; and FIGURE 10 is a block diagram showing sector error detector logic for indicating that there is an error in the comparison of the sector counter and the sector address amplifier.

GENERAL DESCRIPTION

Figure 1:
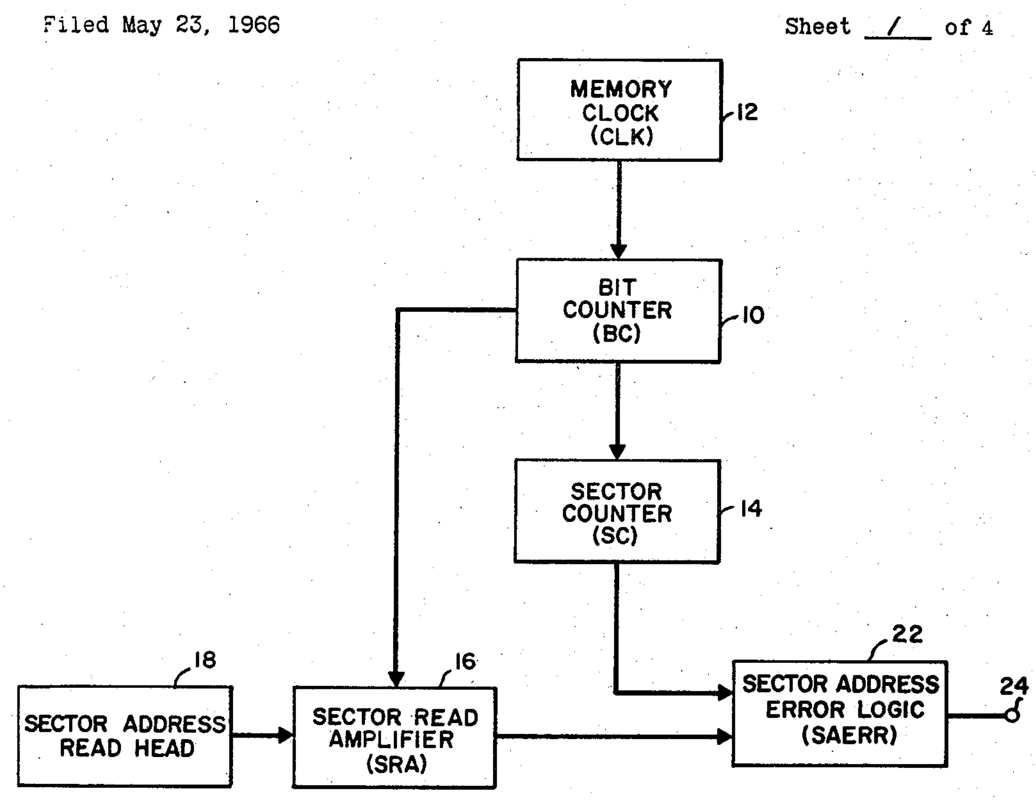
FIGURE 1 is a block diagram showing the overall sector address system used in the present invention.

Turning now to a more detailed description of a preferred embodiment of the present invention and referring specifically to FIGURE 1; a bit counter 10 sequentially counts electrical pulses generated by a memory clock generator 12. The pulses from clock generator 12 will hereinafter be referred to by the term CLK. Bit counter 10 is a binary serial counter which, for this embodiment, counts 0–180 sequentially. The reason for the 0–180 count is that it corresponds to the number of bits in each sector of data that is recorded on a data track of the computer used with this invention. A typical data track is graphically illustrated in FIGURE 2. When the bit counter 10 reaches its final count (180) it is reset and the count again begins from 1. Bit counter 10, its logic and operation will be more fully explained later with connection to FIGURE 3.

A sector counter 14 is incremented by the bit counter 10. Such incrementation occurs through sector carry count (SCC) logic described later in connection with FIGURE 7. When the bit counter 10 attains the count of 163, sector counter 14 is incremented and shifted. This count is attained therein during the remainder of the sector and until the count of 163 is again reached by bit counter 10 during the next sector. Sector counter 14 is thereby sequentially incremented until the final sector of the data track is reached wherein it is returned to 0 and the count again begins with one increment per sector. For this preferred embodiment there are 256 sectors in a data track. Therefore, sector counter 14 counts 0–255.

Figure 2:
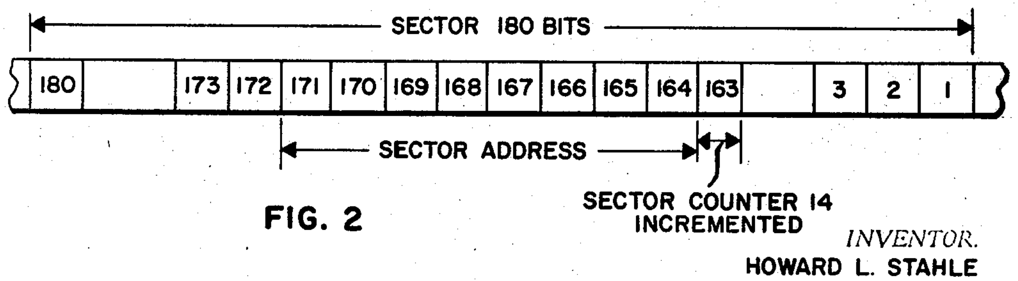
FIGURE 2 is a graphic illustration showing a particular sector of a data track.

The data track illustrated in FIGURE 2 illustrates a typical 8 bit sector of 180 bits wherein the sector address is located in bits 164–171. A sector address read amplifier 16 is enabled by bit counter 10 when the sector address time appears in the data track. The address recorded in the data track is read by the sector address read head 18. Sector address error logic SAERR 22, further explained later in connection with FIGURE 10 and FIGURE 11, enables sector address output means (not shown) on terminal 24 which indicates that an error has or has not occurred.

BIT COUNTER

Figures 3, 4, 5:
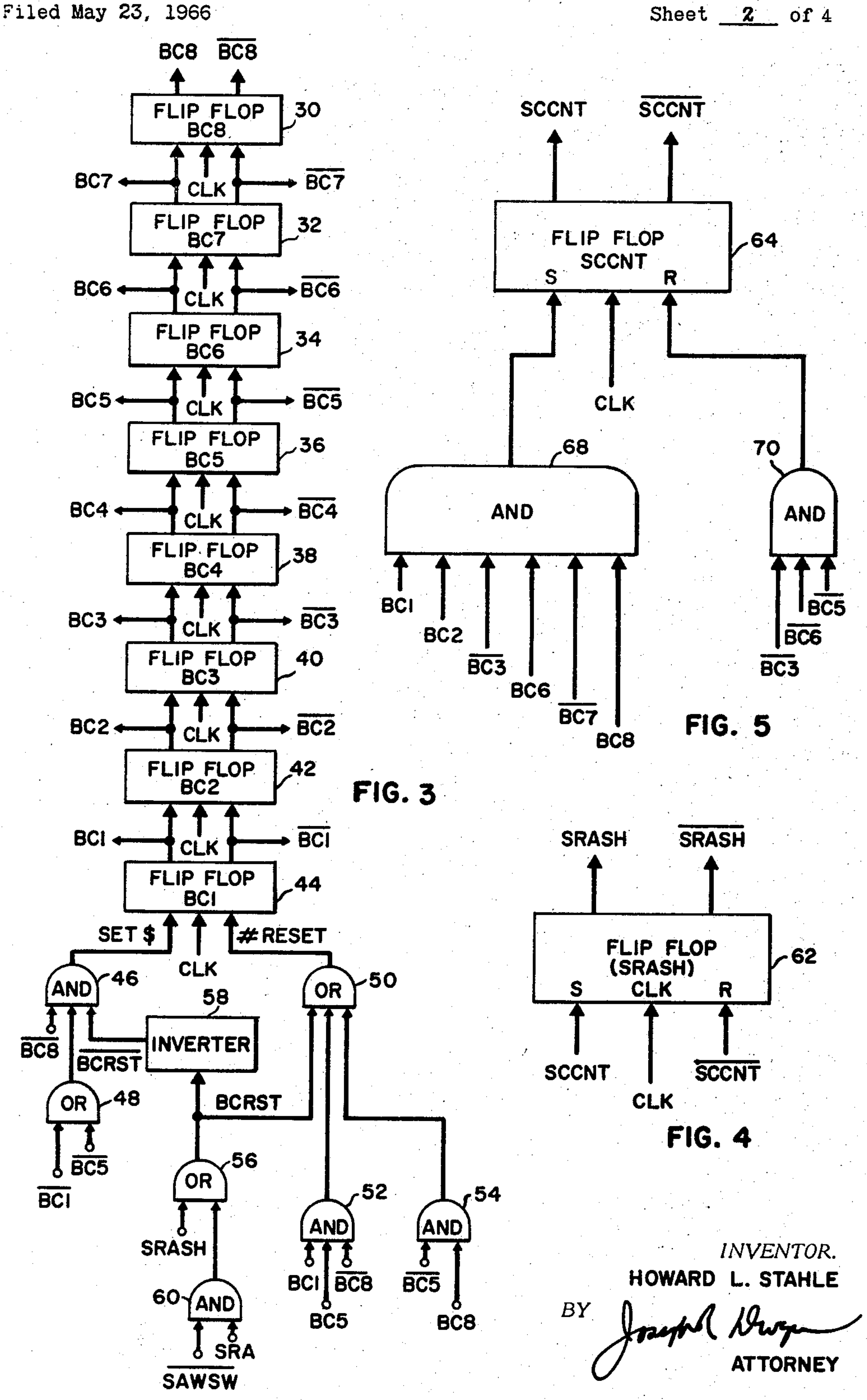
FIGURE 3 is a block diagram showing a bit counter and associated logic diagrams used with the present preferred embodiment.
FIGURE 4 is a block diagram showing sector logic diagrams which is used for incrementing a sector counter used with the present invention on a specific count of the bit counter.
FIGURE 5 is a block diagram showing the sector read amplifier shift logic diagram which specifies when the sector address is being read from the sector read amplifier.

FIGURE 3 illustrates the eight flip-flops 30, 32, 34, 36, 38, 40, 42, and 44, and associated enabling logic which comprises the 8-bit binary serial bit counter 10. Each flip-flop in bit counter 10 is incremented by the preceding flip-flop, depending upon its particular state. The outputs therefrom provide the 180 different codes representative of the 180 bits of the sector (BC1–BC8). Each flip-flop in this particular bit counter 10 is of the conventional JK type which requires a clock signal (CLK) present before the shift by the enabling logic is possible.

BC1 flip-flop is enabled by the following input term and expressed in Boolean algebra as;

BC1 set, $CLK=(\overline{BC1}+\overline{BC5})\cdot\overline{BC8}\cdot\overline{BCRST}$ BC1 reset, $CLK=BC8\cdot\overline{BC5}+BC1\cdot\overline{BC5}+\overline{BCRST}$ wherein the BC1 through BC8 terms emanate from within bit counter 10 itself and provide the 180 bit binary code to sequentially be counter therein, and the term BCRST is the term which resets the first bit in the bit counter 10 to zero.

A logic circuit diagram as shown in FIGURE 3 has the set input of BC1 flip-flop coupled to the output of an AND gate 46 which in turn has three inputs, one of which is the term $\overline{BC8}$. Another receives the term $\overline{BCRST}$ (Bit Counter Reset) and the third input to AND gate 46 comes from the output of an OR gate 48 which in turn has two inputs $\overline{BC1}$ and $\overline{BC5}$.

The reset input of BC1 flip-flop 44 is coupled to an OR gate 50 which in turn has three inputs, one of which receives the term BCRST and the other two inputs to OR gate 50 are coupled to the outputs of AND gates 52 and 54, respectively, wherein AND gate 52 has three inputs, enabled by the bit counter 10 term $BC1\cdot BC5\cdot\overline{BC8}$. An AND gate 54 has two inputs and is enabled by the term $\overline{BC5}\cdot BC8$.

The bit counter reset term BCRST emanates from the output of an OR gate 56 and is presented to OR gate 50. An INVERTER 58 is also coupled to the OR gate 56 and thus provides the output term $\overline{BCRST}$ which is then presented to AND gate 46. OR gate 56 is enabled by the output of AND gate 60 which has a pair of inputs SRA and $\overline{SAWSW}$, the term SRA representing the output of sector read amplifier 16 and term SAWSW representing a sector address write switch which is a switch that inhibits the reset of the bit counter 10 by sector read amplifier 16 when initially recording the sector address through a sector write head (not shown). OR gate 56 may also be enabled by the term SRASH which is the output from a sector read amplifier shift flip-flop 62 illustrated in FIGURE 4.

The SRASH flip-flop 62 provides the outputs designated by the terms SRASH and $\overline{SRASH}$. SRASH flip-flop 62 (shown in FIGURE 4) receives a set input SCCNT and a reset input $\overline{SCCNT}$ from an SCCNT flip-flop 64. SCCNT flip-flop 64 provides a sector counter count (SCCNT) and is an eight-bit time signal decoder of the bit counter 10 which is used to increment the sector counter 14 on bit time 163 as shown in FIGURE 2. SCCNT flip-flop is operated by the following terms;

SCCNT set, $CLK=BC1\cdot BC2\cdot\overline{BC3}\cdot BC6\cdot\overline{BC7}\cdot BC8$ SCCNT reset, $CLK=\overline{BC3}\cdot\overline{BC6}\cdot\overline{BC5}$ and these terms are presented to AND gates 68 and 70 respectively whereby it can be seen that the terms BC1, BC2, $\overline{BC3}$, BC6, BC7, BC8 are only present when bit counter 10 has a binary count of 163 therein. The term $\overline{BC3}\cdot\overline{BC6}\cdot\overline{BC5}$ indicates that the bit counter 10 has a binary count 172 contained therein and therefore, resets SCCNT flip-flop in preparation for the next set term.

Bit counter 10 of FIGURE 3 is shifted sequentially each time BC1 flip-flop 44 shifts BC2 flip-flop 42 and BC2 flip-flop 42 shifts BC3 flip-flop 40 and so on until BC8 flip-flop 30 shifts BC1 flip-flop again. A sequential binary count is thereby presented by bit counter 10. The variation of the 180 different codes is achieved by the logic employed in shifting BC8 to BC1.

SECTOR COUNTER

Figure 6:
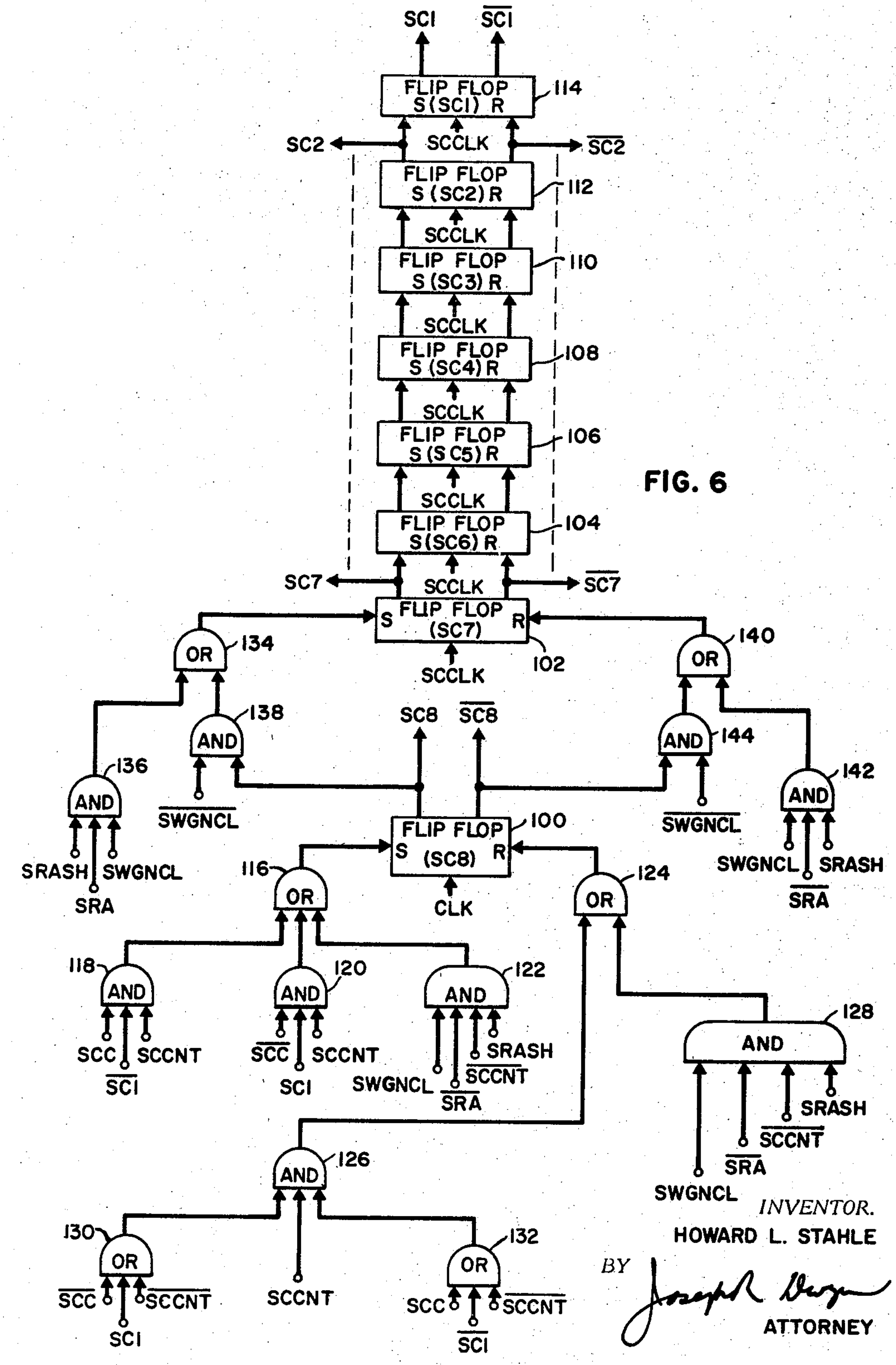
FIGURE 6 is a block diagram showing a sector counter and associative logic diagrams used for the incrementation thereof.

FIGURE 6 illustrates block diagrams of logic circuits for sector counter 14. Sector counter 14 is an eight-bit binary serial counter and operates somewhat similarly to bit counter 10. It is incremented by the SCCNT flip-flop 64 which is controlled by the bit counter 10 as previously discussed. Like bit counter 10, sector counter 14 comprises eight flip-flops, 100, 102, 104, 106, 108, 110, 112, and 114, and provides the terms (SC1–SC8).

Sector counter 14 has a special reset switch which is used to reset all errors during initial start-up of the system and is designated hereafter as the term SWGNCL which stands for switch general clear.

SC8 flip-flop 100 is logically enabled at its set and reset inputs by the following equation:

SC8 set, $SCCLK=SCC\cdot\overline{SC1}\cdot SCCNT+\overline{SCC}\cdot SC1\cdot SCCNT+SWGNCL\cdot SRA\cdot\overline{SCCNT}\cdot SRASH$ SC8 reset, $SCCLK=(\overline{SCC}+SC1+\overline{SCCNT})\cdot(SCC+\overline{SC1}+\overline{SCCNT})\cdot SCCNT+SWGNCL\cdot\overline{SRA}\cdot\overline{SCCNT}\cdot SRASH$ where; SCC is the output of sector counter carry flip-flop 146 shown in FIGURE 7 which is used to increment sector counter 14; SCCNT being the output of SCCNT flip-flop 64 shown in FIGURE 5; SRASH being the output of SRASH flip-flop 62 shown in FIGURE 4, and SRA being the output from sector read amplifier 16 and SWGNCL being the switch general clear as previously discussed.

The SCCLK term is the sector counter clock output emanating from OR gate 152 as shown in FIGURE 8 and occurs only 8 times per sector for shifting sector counter 14.

Logic circuit diagrams in FIGURE 6 show the set side of SC8 flip-flop 100 coupled to the output of an OR gate 116 which in turn has three enabling inputs, one of which is coupled to the output of AND gate 118. AND gate 118 in turn is enabled by the terms $SCC\cdot\overline{SC1}\cdot SCCNT$. A second enabling input to OR gate 116 comes from the output of an AND gate 120 which is enabled by the term $\overline{SCC}\cdot SC1\cdot SCCNT$. The final enabling input to OR gate 116 is coupled to the output of AND gate 122 which in turn is enabled by four inputs $$SWGNCL\cdot SRA\cdot \overline{SCCNT}\cdot SRASH$$

The reset side of SC8 flip-flop is enabled by the output of an OR gate 124 which has a pair of enabling inputs coupled to the outputs of AND gates 126 and 128. AND gate 126 is enabled by the term SCCNT and the outputs of OR gates 130 and 132 wherein OR gate 130 is enabled by $\overline{SCC}+SC1+\overline{SCCNT}$ and OR gate 132 is enabeld by the term $SCC+\overline{SC1}+\overline{SCCNT}$. AND gate 128 is enabled by $SWGNCL\cdot \overline{SRA}\cdot \overline{SCCNT}\cdot SRASH$.

Thus, it is possible to set SC8 flip-flop when an enabling signal is present from SCCNT flip-flop 64 and the SC1 flip-flop 114 is true providing an CLK is present, or if SRASH flip-flop 62 is true an output is present from the sector read amplifier 16 and the SWGNCL switch is enabled. Also, flip-flop 62 can be reset when SCC flip-flop 146 is true, the SC1 flip-flop 114 is false, and SCCNT flip-flop 64 is true.

SC8 flip-flop 100 is reset if SCCNT flip-flop 64 is true and if SC1 flip-flop 114 is true or if SCC flip-flop 146 is true.

SC7 flip-flop 102 is enabled at its set and reset inputs by the following equation:

SC7 set, $SCCLK=\overline{SWGNCL}\cdot SC8 + SWGNCL\cdot SRA\cdot SRASH$

SC7 reset, $SCCLK=\overline{SWGNCL}\cdot \overline{SC8} + SWGNCL\cdot \overline{SRA}\cdot SRASH$ FIGURE 6 illustrates logic circuits for implementing the above equation wherein the set side of SC7 flip-flop is coupled to the output of OR gate 134 which may be enabled by the outputs of AND gate 136 or AND gate 138 wherein AND gate 136 is enabled by the terms $SRASH\cdot SRA\cdot SWGNCL$ and AND gate 138 is enabled by $\overline{\text{SWGNCL}}$ and the SC8 output of SC8 flip-flop 100. The reset side of SC7 flip-flop 102 is coupled to the output of an OR gate 140 which in turn may be enabled by the term $SWGNCL\cdot \overline{SRA}\cdot SRASH$ and AND gate 144 is enabled by $\overline{SC8}\cdot \overline{SWGNCL}$.

Referring now to FIGURE 7, a sector counter carry (SCC) flip-flop 146 provides the term SCC to increment the sector counter 14. The set and reset of the SCC flip-flop 146 is logically enabled by the following equation:

SCC set, $CLK=BC1\cdot BC2\cdot \overline{BC3}\cdot BC6\cdot \overline{BC7}\cdot BC8$ SCC reset, $CLK=\overline{SC1}\cdot SCC$ Logic circuitry used to implement the set and reset input equations include an AND gate 148 which is enabled by $BC1\cdot BC2\cdot \overline{BC3}\cdot BC6\cdot \overline{BC7}\cdot BC8$ terms from bit counter 10. Should such inputs be present, it indicates that bit location 163 of the data track, as shown in FIGURE 2, is present. The reset is implemented by the AND gate 150 that is enabled by $\overline{SC1}\cdot SCC$. Thus, if SCC flip-flop 146 is true, and SC1 flip-flop is false, SCC flip-flop 146 will be reset.

To provide the sector counter clock (SCCLK) an OR gate 152 (shown in FIGURE 8) is enabled by the term $\overline{CLK}+SCCNTD$, wherein SCCNTD is the sector counter count delayed and is the increment signal used to gate the shift clock to sector counter 15. The SCCNTD is provided by the equations:

$$\overline{SCCNTD}=\overline{SCCNT}\cdot CLK+\overline{SCCNTD}$$
$$SCCNTD=SCCNT\cdot CLK+SCCNTD$$

Thus, to implement the above equation, the logic flip-flop gate circuit shown in FIGURE 9 is used whereby OR gate 154 receives enabling inputs $\overline{\text{SCCNTD}}$ or the output of AND gate 156, and OR gate 158 is enabled by the term SCCNTD which comes from the output of OR gate 154 or it is enabled by the output from AND gate 160. AND gate 156 is enabled by the term $SCCNT\cdot CLK$. AND gate 160 is enabled by $\overline{CLK}\cdot SCCNT$. OR gate 158 provides the output term $\overline{\text{SCCNTD}}$ which is coupled into OR gate 154.

When SCCNT is true, bit 1 of the sector counter 14 is shifted to bit position 8, bit 8 to 7, and so on. The state of bit 8, true or false, after the shift, is dependent upon two conditions.

To illustrate, assume that the sector counter 14 is at the start of a revolution and it reads all zeros. When the bit counter is at bit 163, for instance, SCC flip-flop 146 and SCCNT flip-flop 64 will be set. At the next clock time (bit 164) bit 1 of the sector counter 14 will be shifted to bit position 8, bit position 8 to bit 7, and so forth. Bit 1 of sector counter 14 is false when SCC flip-flop 146 is true. Therefore, bit 8 will be gated true. Bit 8 now contains the least significant bit of the new sector address. At the same clock time 164 a sector read amplifier shift signal (SRASH) is generated, which permits a comparison of the least significant bit of the sector to be generated by a sector address read by the sector address read head 18. If they do not compare, a sector error signal is generated.

SECTOR ERROR DETECTOR 22

FIGURE 10 illustrates the sector error detector 22 which provides SAERR and $\overline{\text{SAERR}}$, which comprises a SAERR flip-flop 300 which is enabled by the following terms:

SAERR set, $CLK=SRASH\cdot SRA\cdot \overline{SC8} + SRASH\cdot \overline{SRA}\cdot SC8+\overline{SRASH}\cdot SRA$ SAERR reset, $CLK=SWGNCL$ FIGURE 10 illustrates logic circuits for implementing the above equations.

The SAERR flip-flop 300 is set by the output of OR gate 302. OR gate 302 in turn is enabled by the outputs of AND gate 304 or AND gate 306 or AND gate 308. AND gate 304 is enabled by the term $SRASH\cdot SRA\cdot \overline{SC8}$, wherein the SRASH emanates from the flip-flop 62 in FIGURE 4, the SRA term from the sector read amplifier 22, and the $\overline{\text{SC8}}$ from the sector counter 16 of FIGURE 6.

AND gate 306 is enabled by the SRASH term and the SRA term and the AND gate 308 is enabled by the $SRASH\cdot SRA\cdot SC8$ term, and the SAERR flip-flop 300 is reset by the term SWGNCL, which again is a contact on the outside circuitry and resets all error when turning the system on.

The contents of sector counter 14 may be applied to a sector address write head (not shown) via an appropriate sector address write logic (not shown). The appropriate logic for writing the address in sector counter 22 may be provided by appropriate sector address write logic.

Having thus explained one embodiment of this invention, what is claimed is:

1. In an electronic computer address system:

a bit counter, said bit counter capable of being incremented by a clock signal supplied by a memory system of said electronic computer;

a sector counter, said sector counter being incremented by a specific count of said bit counter;

a sector read amplifier for reading the sector address from a particular data track of the memory system, said sector read amplifier being capable of being enabled by a specific count of said bit counter, said sector read amplifier being capable of holding the address data the electronic computer is operating on; and means for detecting a difference in the contents of said sector read amplifier with the contents of said sector counter.

2. In an electronic computer addressing system as defined in claim 1, including a sector address indicating means for indicating an erroneous sector address, said sector address indicating means being coupled to said sector counter, said sector address indicating means being enabled by said sector address error indicating means when the contents of said sector counter differs with the contents of said sector address read amplifier.

3. In an electronic computer addressing system as defined in claim 1 wherein said means for detecting a difference in the contents of said sector read amplifier with the contents of said sector counter includes a gating means being enabled by a particular significant bit of said sector counter and a corresponding particular significant bit of said sector read amplifier.

4. In an electronic computer address system as defined in claim 1, wherein said bit counter being capable of counting the words in a particular sector and a sector counter being capable of counting the sectors in a particular data track on the memory system of the electronic computer.

5. In an electronic computer as defined in claim 1, including a sector address indicating means, said sector address indicating means being coupled to and enabled by said means for detecting a difference in the content of said sector read amplifier with the contents of said sector counter, said sector address indicating means being capable of indicating the sector address in which an error occurs.

References Cited

UNITED STATES PATENTS

| | | | |
|---|---|---|---|
| 3,311,890 | 3/1967 | Waaben | 340—172.5 |
| 3,293,615 | 12/1966 | Mullery et al. | 340—172.5 |
| 3,193,800 | 7/1965 | Shoultes | 340—172.5 |
| 3,139,521 | 6/1964 | Johnson | 235—92 |
| 3,071,739 | 1/1963 | Runyon | 333—18 |
| 2,947,478 | 8/1960 | Lentz et al. | 235—160 |

PAUL J. HENON, *Primary Examiner.*

G. D. SHAW, *Assistant Examiner.*